Figure 1:
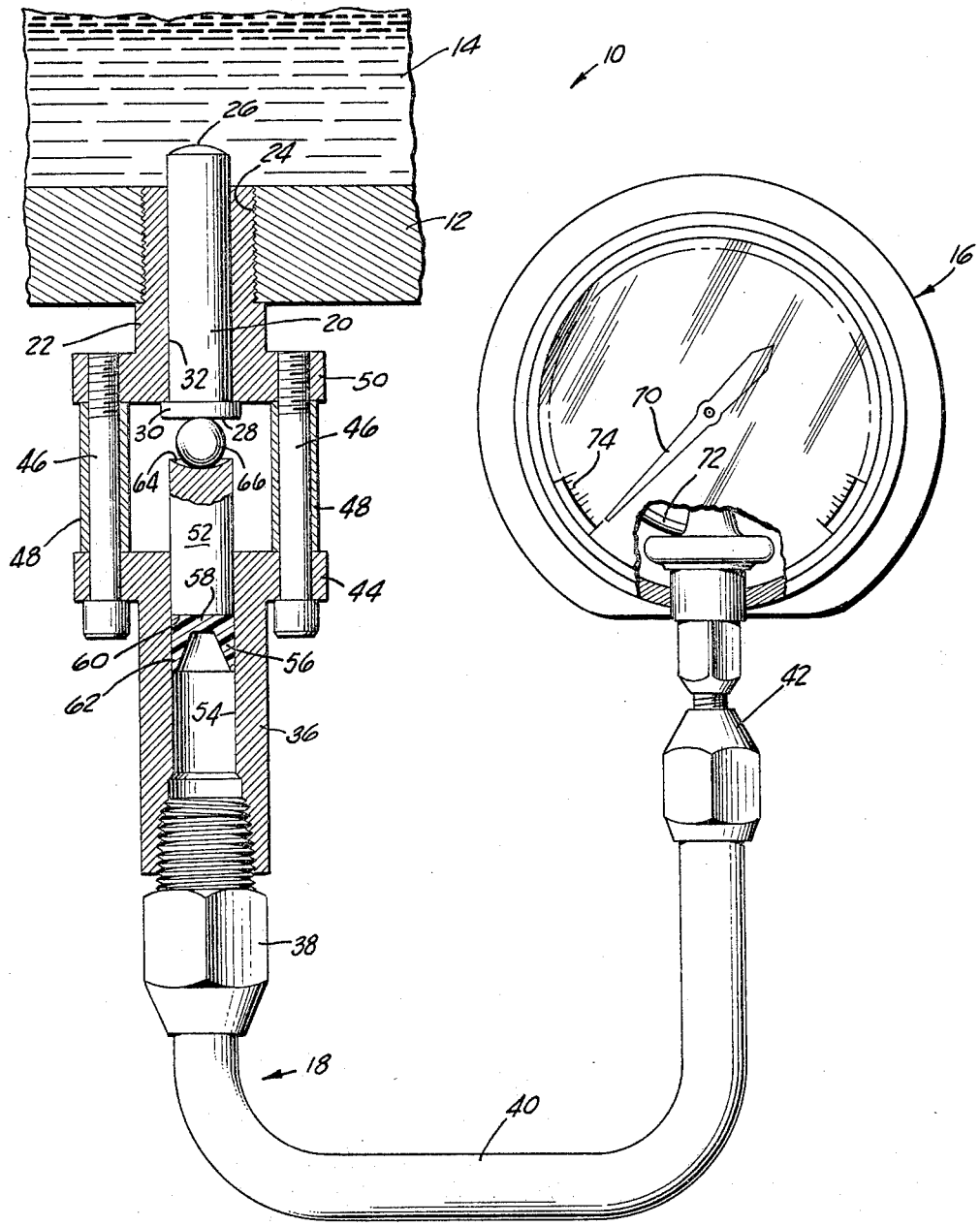

Aug. 9, 1966  M. W. MARTIN, JR  3,264,872
GAUGE ASSEMBLY FOR MEASURING HEATED FLUID PRESSURES

Filed May 4, 1964

INVENTOR.
MERRITT W. MARTIN, JR.
BY
Olsen and Stephenson
ATTORNEYS

United States Patent Office 3,264,872
Patented August 9, 1966

3,264,872
GAUGE ASSEMBLY FOR MEASURING HEATED FLUID PRESSURES
Merritt W. Martin, Jr., Saline, Mich., assignor to Hoover Ball and Bearing Company, Saline, Mich., a corporation of Michigan
Filed May 4, 1964, Ser. No. 364,414
7 Claims. (Cl. 73—419)

This invention relates generally to pressure gauge assemblies and more particularly to an improved gauge assembly for indicating the pressure of a heated fluid or semi-fluid such as molten plastic.

In plastic molding machines and the like, such as the blow molding machine illustrated in application Serial No. 236,382, filed November 8, 1962, owned by the assignee of this application, a gauge assembly for continually indicating the pressure of plastic in the machine is desirable. In a blow molding machine of the type illustrated in the above-identified application, the gauge assembly is mounted on the accumulator or the extruder so as to provide a continuous visual indication of the pressure of the heated plastic in the machine. A gauge assembly of this type should be rugged, since the moving parts of the assembly must move during each cycle of the machine as the pressure of the plastic in the machine varies, should be economical to build and install, and should minimize heat transfer between the heated plastic and the moving and fluid parts of the gauge so as to prolong the useful life of the gauge assembly. It is an object of this invention, therefore, to provide an improved gauge assembly of this type which is rugged in construction, economical to manufacture and operate, and which has a prolonged service life.

Further objects, features and advantages of this invention will become apparent from a consideration of the following description, the appended claims, and the accompanying drawing in which:

FIGURE 1 is an elevational view of the gauge assembly of this invention, with some parts broken away and shown in section for the purpose of clarity, and showing the assembly attached to a body containing a heated fluid.

With reference to the drawing, the gauge assembly of this invention, indicated generally at 10, is illustrated in FIG. 1 attached to a body 12, which can be the extruder or the accumulator in a blow molding machine and which contains a heated fluid 14. The fluid 14 can be molten plastic, such as polyethylene or polypropylene, which is sometimes referred to as a semi-fluid, but which is included in the term "fluid" in this application since in actuating the gauge assembly 10, a molten plastic functions the same as any other fluid. The gauge assembly 10 includes a conventional gauge 16, which is illustrated as being of Bourdon tube type, connected by a conduit assembly 18 to a pressure sensing member 20 which is in the form of a plunger positioned so that it contacts the fluid 14. The plunger 20 is mounted for reciprocal sliding movement in a support member 22 which is threaded into a threaded opening 24 in the body 12 so that the inner end 26 of the plunger 20 is in contact with the heated fluid 14. The outer end 28 of the plunger 20 is provided with a flange 30 engageable with the support member 22 to limit inward travel of the plunger 20 to the position illustrated in FIG. 1. The plunger 20 is sufficiently undersize relative to the bore 32 in the support member 22 in which the plunger 20 slides to permit free reciprocal sliding movement of the plunger 20. The undersize plunger 20 provides for a small and continuous leakage of fluid 14 through the bore 32 and around the plunger 20. In a normal position of the plunger 20, during use of the gauge assembly 10, the flange 30 is spaced from the support member 22 so that as the pressure of the fluid 14 decreases, the plunger 20 moves inwardly in the bore 32 and as the pressure of the fluid 14 increases, the plunger 20 moves outwardly in the bore 32. The position of the plunger 20 is preferably adjusted so that in the inner position of plunger 20, it extends out of the bore 32 and into the fluid 14. In cases in which the fluid 14 is plastic, this arrangement prevents trapping and burning of plastic in the inner end of bore 32.

The conduit assembly 18 consists of a tubular body 36 which is connected, by means of a fitting 38, to one end of a tube 40, the opposite end of which is connected by a fitting 42 to the gauge 16. The tubular body 36 is provided with a flange 44 which is connected by bolts 46, and spacer sleeves 48 which surround the bolts 46, to a corresponding flange 50 on the support member 22 so as to maintain the tubular body 36 in a predetermined spaced relation with the support member 22.

A gauge actuating member 52, which is also in the form of a plunger, is mounted for reciprocal sliding movement in the bore 54 of the tubular body 36 at a position such that the plunger 52 is in substantial axial alignment with the plunger 20. A cup-shaped seal 56, preferably formed of a plastic material such as Teflon, is positioned in the bore 36 so that the base 58 of the seal 56 engages the inner end 60 of the plunger 52. The annular flange 62 which is formed integral with the base 58 of the seal 56 is positioned in substantial sealing engagement with the walls of the bore 54. The opposite end 64 of the plunger 52 is concavely shaped and a ball 66 formed of steel or the like is positioned in engagement with and between the adjacent plunger ends 28 and 64 as shown in FIG. 1.

The ball 66, by virtue of its spherical shape, is in substantially point-to-point engagement with both the plunger end 28 and the plunger end 64. The end 64 of the plunger 52 is concavely shaped to prevent the ball 66 from moving out of its position between the plungers 20 and 52, and the radius of the concave end 64 is sufficiently larger than the radius of the ball 66 to preclude more than substantial point-to-point engagement between the end 64 and the ball 66 to minimize heat transfer between the plungers 20 and 52.

The conduit assembly 18, between the seal 56 and the gauge 16 is filled with a suitable fluid which continually maintains pressure on the end 60 of the plunger 52 sufficient to urge the plunger 52 toward the plunger 20 and maintain the ball 66 clamped therebetween. This fluid transmits movement of the actuating plunger 52 to a dial pointer 70 on the gauge 16. This is accomplished in a conventional Bourdon tube gauge by a curved elastic tube 72 in the gauge arranged so that variations in pressure of the fluid in the tube causes anticlastic bending of the tube 72 which effects movement of the dial pointer 70 relative to calibrations 74 on the gauge face plate. Consequently, the position of the dial pointer 70 is responsive to the position of the actuating plunger 52 in the bore 54. This can be accomplished with other pressure responsive gauges, which function similarly to the Bourdon tube gauge 16, such as a diaphragm gauge. In practice it has been found that the gauge 16 works best when the conduit assembly 18 is filled with a high temperature silicone grease, which, for purposes of this application is described as a "fluid" since it functions to translate pressures in the conduit assembly 18 into movement of the dial pointer 70.

In the use of the gauge assembly 10, as the pressure of the heated fluid 14 increases, the plunger 20 is moved outwardly in the bore 32 to in turn move the plunger 52 inwardly in its bore 54 and thereby effect movement of the dial pointer 70 in a direction to indicate increased pressure on the calibrations 74. The gauge assembly 10 is assembled so that the high temperature silicone grease in the conduit assembly 18 continually exerts pressure on the plunger 52 urging it toward the plunger 20 so as to clamp the ball 66 between the plungers 20 and 52. When the pressure of the fluid 14 decreases, the plunger 52 moves toward the support 22 so as to move the plunger 20 inwardly in its bore 32. In each installation, the assembly 10 is installed so that the pressure of the silicone grease is related to the normal pressure variations of the fluid 14 such that the flange 30 on the plunger 20 moves between the flanges 44 and 50 during normal variations in the pressure of the fluid 14.

From the above description it is seen that in the gauge 10 of this invention, the ball 66, by virtue of its substantially point-to-point engagement with the plungers 20 and 52 minimizes heat transfer between a fluid 14 and the grease in the conduit assembly 18. As a result, the gauge assembly 10 is operable over a prolonged service life without danger of burning of the fluid in the conduit assembly 18. Furthermore, since the fluid 14 and the fluid in the conduit assembly 18 are completely separated in the gauge 10, any danger of the fluid in the conduit assembly 18 contaminating the fluid 14 is eliminated. Also, by virtue of the construction of the gauge assembly 10 so that the fluid 14 moves past the plunger 20, any danger of the fluid 14 burning, as in the case of plastic in a blow molding machine, so as to provide discoloration of the plastic, is eliminated.

It will be understood that the gauge assembly for measuring heated fluid pressures which is herein disclosed and described is presented for purposes of explanation and illustration and is not intended to indicate limits of the invention, the scope of which is defined by the following claims.

What is claimed is:

1. In a gauge assembly for measuring the pressure of a heated fluid, a reciprocally movable pressure sensing member having one end positioned so that it is in contact with said fluid so that the position of said member is responsive to the magnitude of the pressure of said fluid, a gauge actuating member positioned in substantial alignment with said sensing member, conduit means in which said actuating member is supported for reciprocal movement, a gauge connected to said conduit means, fluid in said conduit means maintaining a pressure on said actuating member urging it toward said sensing member, and a ball positioned between and in substantially point-to-point engagement with said sensing member and said actuating member to minimize heat transfer between said fluids.

2. Apparatus for measuring the pressure of heated fluid comprising support means, a first plunger reciprocally mounted in said support means and having one end adapted to be positioned in contact with the heated fluid, a second plunger substantially axially aligned with said first plunger, conduit means in which said second plunger is supported, means in said conduit means urging said second plunger toward said first plunger, a ball engaged between and having substantially point contact with the opposite end of said first plunger and one end of said second plunger whereby reciprocal movement of said first plunger is transmitted to said second plunger, and pressure indicating means responsive to the position of said second plunger in said conduit means.

3. Apparatus for measuring the pressure of heated fluid comprising support means, a first plunger reciprocally mounted in a bore in said support means and having one end adapted to be positioned in contact with the heated fluid, said first plunger being undersized with respect to said bore to provide leakage of the heated fluid therethrough, a second plunger substantially axially aligned with said first plunger, conduit means in which said second plunger is supported, fluid means under pressure in said conduit means urging said second plunger toward said first plunger, a ball engaged between and having substantially point contact with the opposite end of said first plunger and one end of said second plunger whereby reciprocal movement of said first plunger is transmitted to said second plunger, and pressure indicating means connected to said conduit means and responsive to the position of said second plunger in said conduit means.

4. In apparatus for measuring the pressure of heated fluid in a body, a support member adapted to be secured to said body, a first plunger reciprocally mounted in said body and having a pair of ends, said plunger having stop means on one end thereof and being positioned in said support member so that one end thereof projects into said heated fluid in a position of said plunger in which said stop means is engaged with said support member, a ball positioned in point-to-point engagement with said one end of said plunger, a second plunger positioned in substantially coaxial relation with said first plunger, conduit means supporting said second plunger for reciprocal movement, means in said conduit means applying a continual pressure on said second plunger urging said second plunger against said ball whereby said ball is clamped between said first and second plungers, means connecting said conduit means to said support member, and means connected to said conduit means and responsive to the reciprocally moved position of said second plunger for indicating the pressure of said fluid.

5. In apparatus for measuring the pressure of heated fluid in a body, a support member adapted to be secured to said body, a first plunger reciprocally mounted in said body and having a pair of ends, one of said plunger ends being positioned in contact with said heated fluid, a ball positioned so that one side thereof is in point-to-point engagement with the opposite end of said plunger, a second plunger positioned in substantially coaxial relation with said first plunger, conduit means supporting said second plunger for reciprocal movement, means in said conduit means applying pressure on said second plunger urging said second plunger against said ball whereby said ball is clamped between said first and second plungers, at least one of the ball-clamping-ends of said first and second plungers being concave, means connecting said conduit means to said support member, and means connected to said conduit means and responsive to the reciprocally moved position of said second plunger for indicating the pressure of said fluid.

6. In apparatus for measuring the pressure of heated fluid in a body, a support member adapted to be secured to said body, a first plunger reciprocally mounted in said body and having a pair of ends, one of said plunger ends being positioned in contact with said heated fluid, a ball positioned so that one side thereof is in point-to-point engagement with the opposite end of said plunger, a second plunger positioned in substantially coaxial relation with said first plunger and having a concave end positioned in engagement with the opposite side of said ball, conduit means supporting said second plunger for reciprocal movement, means in said conduit means applying pressure on said second plunger urging said second plunger against said ball whereby said ball is clamped between said opposite end of said first plunger and said concave end of said second plunger, means connecting said conduit means to said support member, and means connected to said conduit means and responsive to the reciprocally moved position of said second plunger for indicating the pressure of said fluid.

7. In apparatus for measuring the pressure of heated fluid in a body, a support member adapted to be secured to said body, a first plunger reciprocally mounted in said body and having a pair of ends, said plunger being positioned in said support member and projecting therefrom so that the one end of the plunger extends into said heated fluid, a ball positioned so that one side thereof is in point-to-point engagement with the opposite end of said plunger, a second plunger positioned in substantially coaxial relation with said first plunger, conduit means supporting said second plunger for reciprocal movement, fluid in said conduit means applying a continual pressure on said second plunger urging one end of said second plunger against the opposite side of said ball whereby said ball is clamped between said first and second plungers, a cup shape seal positioned in said conduit means in engagement with the opposite end of said second plunger and said conduit means, and means connected to said conduit means and responsive to the reciprocally moved position of said second plunger for indicating the pressure of said fluid.

References Cited by the Examiner

UNITED STATES PATENTS

| | | | |
|---|---|---|---|
| 2,050,084 | 8/1936 | Carliss | 73—419 X |
| 2,748,602 | 6/1956 | Weber | 73—419 X |
| 3,113,460 | 12/1963 | Wrenn | 73—419 |

FOREIGN PATENTS 689,539  4/1953  Great Britain.

LOUIS R. PRINCE, *Primary Examiner.*

D. O. WOODIEL, *Assistant Examiner.*